(12) United States Patent
Kulkarni et al.

(10) Patent No.: US 12,131,080 B2
(45) Date of Patent: Oct. 29, 2024

(54) COMPLIANCE DETERMINATION OF IMAGE FORMING APPARATUSES

(71) Applicant: Hewlett-Packard Development Company, L.P., Spring, TX (US)

(72) Inventors: Sudhindra Venkatesh Kulkarni, Bangalore (IN); Reddapa V Srinivas, Bangalore (IN); Mark A Fahrenkrug, Waukee, IA (US); Laurent Pizot, Vancouver, WA (US); Steven Schaaf Inch, Boise, ID (US); Shivaun Albright, Rocklin, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/011,694

(22) PCT Filed: Apr. 19, 2021

(86) PCT No.: PCT/US2021/070406
§ 371 (c)(1),
(2) Date: Dec. 20, 2022

(87) PCT Pub. No.: WO2022/020827
PCT Pub. Date: Jan. 27, 2022

(65) Prior Publication Data
US 2023/0153044 A1   May 18, 2023

(30) Foreign Application Priority Data
Jul. 20, 2020  (IN) .............................. 202041030909

(51) Int. Cl.
*G06F 3/12* (2006.01)

(52) U.S. Cl.
CPC ............ *G06F 3/1222* (2013.01); *G06F 3/123* (2013.01); *G06F 3/1285* (2013.01)

(58) Field of Classification Search
CPC ....... G06F 3/1222; G06F 3/123; G06F 3/1285
USPC .................................................. 358/1.15, 1.9
See application file for complete search history.

(56) References Cited

U.S. PATENT DOCUMENTS

| | | |
|---|---|---|
| 9,202,063 B1 | 12/2015 | Ekke et al. |
| 2003/0110412 A1 | 6/2003 | Neville |
| 2009/0086252 A1 | 4/2009 | Zucker et al. |
| 2013/0073892 A1 | 3/2013 | Whitlock et al. |
| 2013/0155451 A1* | 6/2013 | Nakahara .............. G06F 3/1204 358/1.15 |

(Continued)

*Primary Examiner* — Quang N Vo
(74) *Attorney, Agent, or Firm* — Michael Dryja

(57) ABSTRACT

In an example, a non-transitory computer readable storage medium may include instructions that when executed cause a computing device to generate a virtual device representation of an image forming apparatus on a cloud. Further, instructions cause the computing device to update the virtual device representation on the cloud with a configuration state of the image forming apparatus. Furthermore, instructions cause the computing device to analyze the updated virtual device representation to determine whether the image forming apparatus is compliant with a stored policy. Further, instructions cause the computing device to initiate, via the virtual device representation, a remediation action to bring the image forming apparatus to compliance based on the determination.

13 Claims, 4 Drawing Sheets

(56) References Cited

U.S. PATENT DOCUMENTS

| | | |
|---|---|---|
| 2013/0235407 A1* | 9/2013 | Kobayashi ......... H04N 1/00973 |
| | | 358/1.13 |
| 2014/0047504 A1 | 2/2014 | Tsuchitoi |
| 2014/0123236 A1 | 5/2014 | Hirata |
| 2015/0015908 A1 | 1/2015 | Tanaka |
| 2016/0112584 A1 | 4/2016 | Park et al. |
| 2016/0231970 A1 | 8/2016 | Tabuki |
| 2017/0300690 A1 | 10/2017 | Ladnai et al. |

* cited by examiner

COMPLIANCE DETERMINATION OF
IMAGE FORMING APPARATUSES

BACKGROUND

Image forming apparatuses can be used to perform functions such as printing documents, transmitting facsimile documents, scanning documents, copying documents, and/or the like. An image forming apparatus may be a single function peripheral (SFP) or a multi-function peripheral (MFP). Example SFP may include a printer, a facsimile machine, a scanner, or a copier that may perform one of the functions. Example MFP can incorporate the functionality of multiple devices in one, to perform a combination of some or all of a printer, a scanner, a photocopier, a fax machine, and the like. To secure such image forming apparatuses, the image forming apparatuses may be configured with security settings.

BRIEF DESCRIPTION OF THE DRAWINGS

Examples are described in the following detailed description and in reference to the drawings, in which.

DETAILED DESCRIPTION

Figure 1:
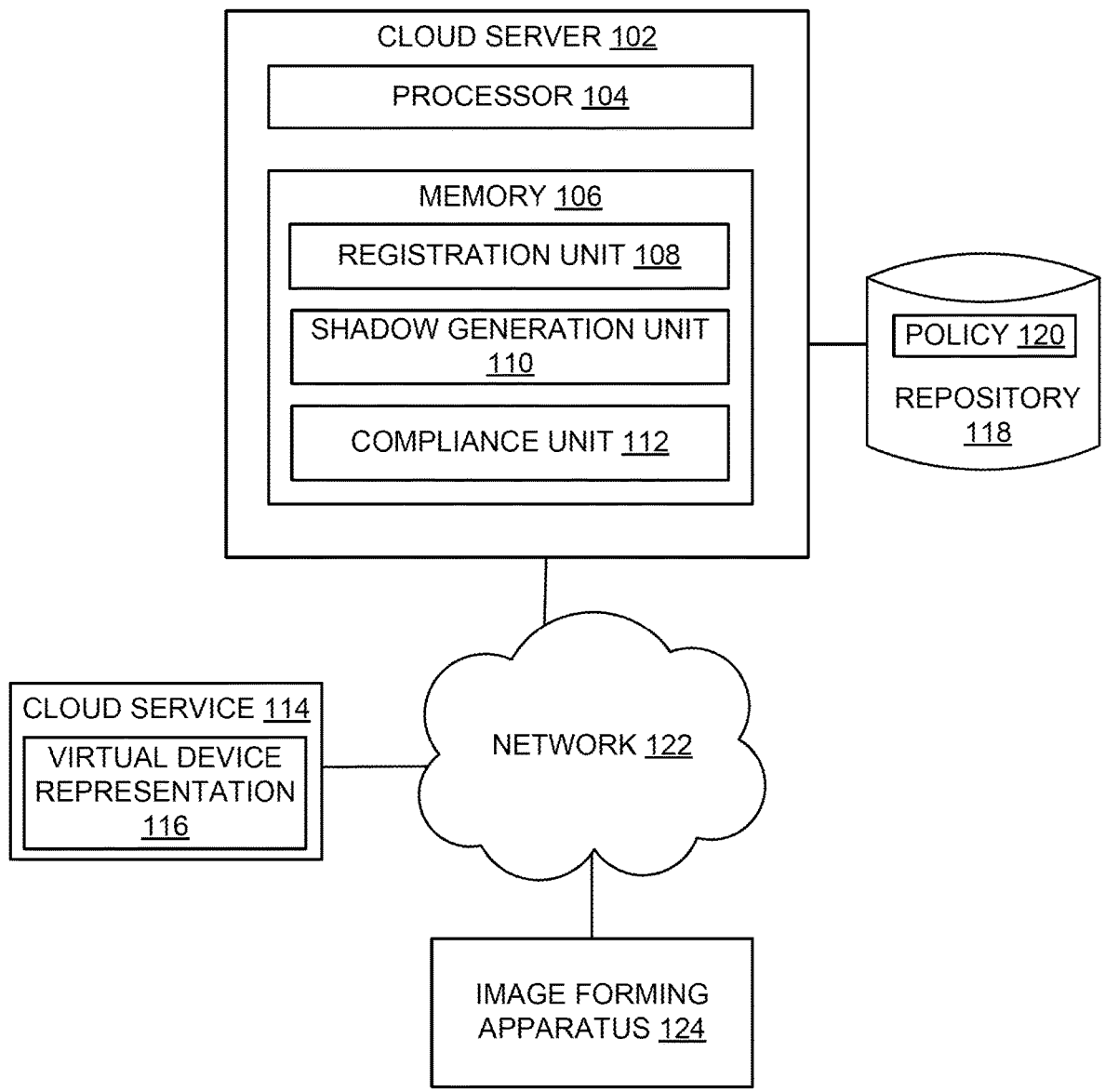
FIG. 1 is a block diagram of an example cloud server, including a compliance unit to bring an image forming apparatus to compliance via a virtual device representation.

In computing, a security policy can be a set of rules that are enforced by organizational policies and/or security mechanisms. A technical implementation of the security policy defines whether a device is secure or unsecure. Modern day image forming apparatuses may increasingly have wireless connectivity capability and are equipped to connect to the Internet. Such image forming apparatuses may have the capability to communicate with cloud servers and/or web services to offer imaging services such as print via internet, scan to mail, and the like. Hence, the image forming apparatuses may have to be kept secure to protect confidential and valuable data of users.

In a networked environment, an image forming apparatus may be shared by multiple users. For example, the users sharing the image forming apparatus may modify default device settings (e.g., defined by an administrator), which may result in security related issues. For example, the security related issues may arise due to unattended documents on the image forming apparatus, sensitive data being processed from a computer to the image forming apparatus, confidential information being stored on image forming apparatus's hard drive, or the like.

Some example methods may provide an on-premise policy-based compliance tool to secure monitoring of a fleet of image forming apparatuses that are locally connected. Such tools may establish a fleet-wide security policy and apply the security policy across the fleet of image forming apparatuses to ensure compliance of the image forming apparatuses with company's security policies. However, such tools may not monitor image forming apparatuses (e.g., cloud connected printers) that are directly connected to the internet.

Examples described herein may provide a cloud-based solution to proactively monitor compliance of an image forming apparatus (e.g., on-boarded in a digital ecosystem) to keep the image forming apparatus and corresponding data secure. Examples described herein may detect any change in configuration data (e.g., security settings, operational settings, and the like) of the image forming apparatus against a stored policy and initiate a remediation action through a cloud platform to bring the image forming apparatus to compliance. The terms "cloud", "cloud platform", and "cloud computing environment" are used interchangeably throughout the document and refer to an entity that provides a cloud service via the Internet.

In one example, a cloud server may generate a virtual device representation corresponding to an image forming apparatus in the cloud platform. The virtual device representation may include configuration data representing a state of the image forming apparatus. The cloud server may evaluate the virtual device representation to determine whether the image forming apparatus is compliant with a stored policy. The cloud server may initiate a remediation action via the virtual device representation to bring the image forming apparatus to compliance based on the determination. Thus, examples described herein may ensure that in an event a device setting gets misconfigured during setup or run-time, the image forming apparatus can be assessed and the changed settings can be reset through the virtual device representation to ensure protection.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1 is a block diagram of an example cloud server 102, including a compliance unit 112 to bring an image forming apparatus 124 to compliance via a virtual device representation 116. As shown in FIG. 1, cloud server 102 may be communicatively coupled to image forming apparatus 124 via a network 122. Example network 122 may be a local area network (LAN), a wide area network (WAN), the Internet, a wired connection, and/or the like. A network printing environment of FIG. 1 is illustrated using image forming apparatus 124, however, the network printing environment can include multiple image forming apparatuses communicatively connected to cloud server 102.

As used herein, the term "image forming apparatus" may refer to a printing device that may encompass any apparatus that accepts a job-request and performs at least one of the following functions or tasks: print, scan, copy, and/or fax. Image forming apparatus 124 may be a single function peripheral (SFP) or a multi-function peripheral (MFP). Example image forming apparatus 124 can be a laser beam printer (e.g., using an electrophotographic method for printing), an ink jet printer (e.g., using an ink jet method for printing), or the like.

As shown in FIG. 1, cloud server 102 may include a processor 104 and a memory 106 coupled to processor 104. Furthermore, cloud server 102 may include registration unit 108, shadow generation unit 110, and compliance unit 112 stored in memory 106 and executable by processor 104. During operation, registration unit 108 may register image forming apparatus 124 to a cloud service 114 via network 122. Cloud service 114 may be resident in a cloud network and provided as a cloud-based service or as part of a cloud platform. Cloud service 114 may be made available to users on demand via the Internet from cloud server 102. Example cloud service 114 may provide a service to monitor security and compliance of image forming apparatus 124 that is registered with cloud service 114. The companies that provide cloud service 114 may be examples of service providers.

In an example, registration unit 108 may receive a registration request from a user and register image forming apparatus 124 with cloud service 114 based on the registration request. The user may register image forming apparatus 124 on cloud server 102 to allow image forming apparatus 124 to cooperate with cloud server 102 that provides cloud service 114. For example, image forming apparatus 124 may be registered using device information such as a printer ID, a printer name, a proxy ID, capabilities, identification information, a proxy type, and/or the like. The device information is stored in memory 106, a repository 118, or any other storage. Further, information about the user who has registered image forming apparatus 124 may also be stored in memory 106, repository 118, or any other storage. Example user information may include a user account and a password. The user information may be mapped to the device information such that the user with the user information can define policy 120, edit policy 120, register image forming apparatus 124 with cloud service 114, de-register image forming apparatus 124 from cloud service 114, and the like.

Further, shadow generation unit 110 may generate virtual device representation 116 corresponding to image forming apparatus 124 in cloud service 114 in response to registering image forming apparatus 124. In an example, virtual device representation 116 may be a device shadow of image forming apparatus 124. Further, virtual device representation 116 may include first configuration data representing a configuration state of image forming apparatus 124. Example first configuration data may include operational settings, security settings, and the like.

Furthermore, compliance unit 112 may evaluate virtual device representation 116 to determine whether image forming apparatus 124 is compliant with policy 120 stored in repository 118. Example policy 120 may include a security policy. For example, the security policy may indicate a setting value of a security setting that image forming apparatus 124 is to use. Example security setting may include an authentication setting (e.g., security credential, certificate management, and the like), device control setting (e.g., stored data, control panel, external connection, device security check, access control, and the like), device discovery setting (e.g., service location protocol), printing setting (e.g., internet print protocol), digital services setting (e.g., fax, email, and the like), network security setting (e.g., internet protocol security, access control, and the like), network services setting (e.g., web, remote config, and the like), shared items setting (e.g., lightweight directory access protocol (LDAP) settings, outgoing e-mail, and the like), and so on.

When image forming apparatus 124 is compliant with policy 120, the user may be notified of the security status of image forming apparatus 124 via a user interface (e.g., a smart suite, a portal touch point, or the like). In response to a determination that image forming apparatus 124 is not in compliant with policy 120, compliance unit 112 may modify virtual device representation 116 to bring image forming apparatus 124 to compliance. Further, compliance unit 112 may transmit a notification indicative of a configuration state represented by modified virtual device representation 116 to image forming apparatus 124 via network 122. Furthermore, shadow generation unit 110 may enable synchronization of image forming apparatus 124 with the configuration state represented by modified virtual device representation 116 using a synchronization protocol in response to transmission of the notification.

In other examples, shadow generation unit 110 may obtain second configuration data from image forming apparatus 124 at a defined interval (e.g., every 15 minutes). The second configuration data may describe a change in the configuration state of image forming apparatus 124. Shadow generation unit 110 may update virtual device representation 116 based on the second configuration data obtained from image forming apparatus 124 at the defined interval. Then, compliance unit 112 may repeat the steps of evaluate, modify, and transmit the notification corresponding to updated virtual device representation 116. Thus, compliance unit 112 may enable secure enforcement of policies through virtual device representation 116 on the cloud platform to image forming apparatus 124.

In other examples, in an event of change in policy 120 to accommodate a new security advisory, compliance unit 112 may trigger a compliance assessment against the changed policy to bring image forming apparatus 124 to compliance with the changed policy. In one example, compliance unit 112 may detect a change in policy 120, analyze virtual device representation 116 to determine whether image forming apparatus 124 is compliant with the changed policy, and modify virtual device representation 116 to bring image forming apparatus 124 to compliance in response to a determination that image forming apparatus 124 is not in compliant with the changed policy. Further, compliance unit 112 may transmit another notification indicative of the configuration state represented by modified virtual device representation 116 to image forming apparatus 124 to enable synchronization of image forming apparatus 124 with the configuration state represented by modified virtual device representation 116. Thus, compliance unit 112 may push any change in the security policy to accommodate new security advisories or to handle new threats/vulnerabilities to image forming apparatus 124 through the cloud platform. In the example described in FIG. 1, cloud server 102, cloud service 114, and repository 118 can be implemented as part of a cloud infrastructure on the cloud platform.

In some examples, the functionalities described herein, in relation to instructions to implement functions of registration unit 108, shadow generation unit 110, compliance unit 112, and any additional instructions described herein in relation to the storage medium, may be implemented as engines or modules including any combination of hardware and programming to implement the functionalities of the modules or engines described herein. The functions of registration unit 108, shadow generation unit 110, and compliance unit 112 may also be implemented by a respective processor 104. In examples described herein, processor 104 may include, for example, one processor or multiple processors included in a single device or distributed across multiple devices. Even though examples described in FIG. 1 implements registration unit 108, shadow generation unit 110, and compliance unit 112 as part of cloud server 102, registration unit 108, shadow generation unit 110, and compliance unit 112 can also be implemented as part of a physical server that manages an image forming apparatus or a fleet of image forming apparatuses within an organization.

Figure 2:
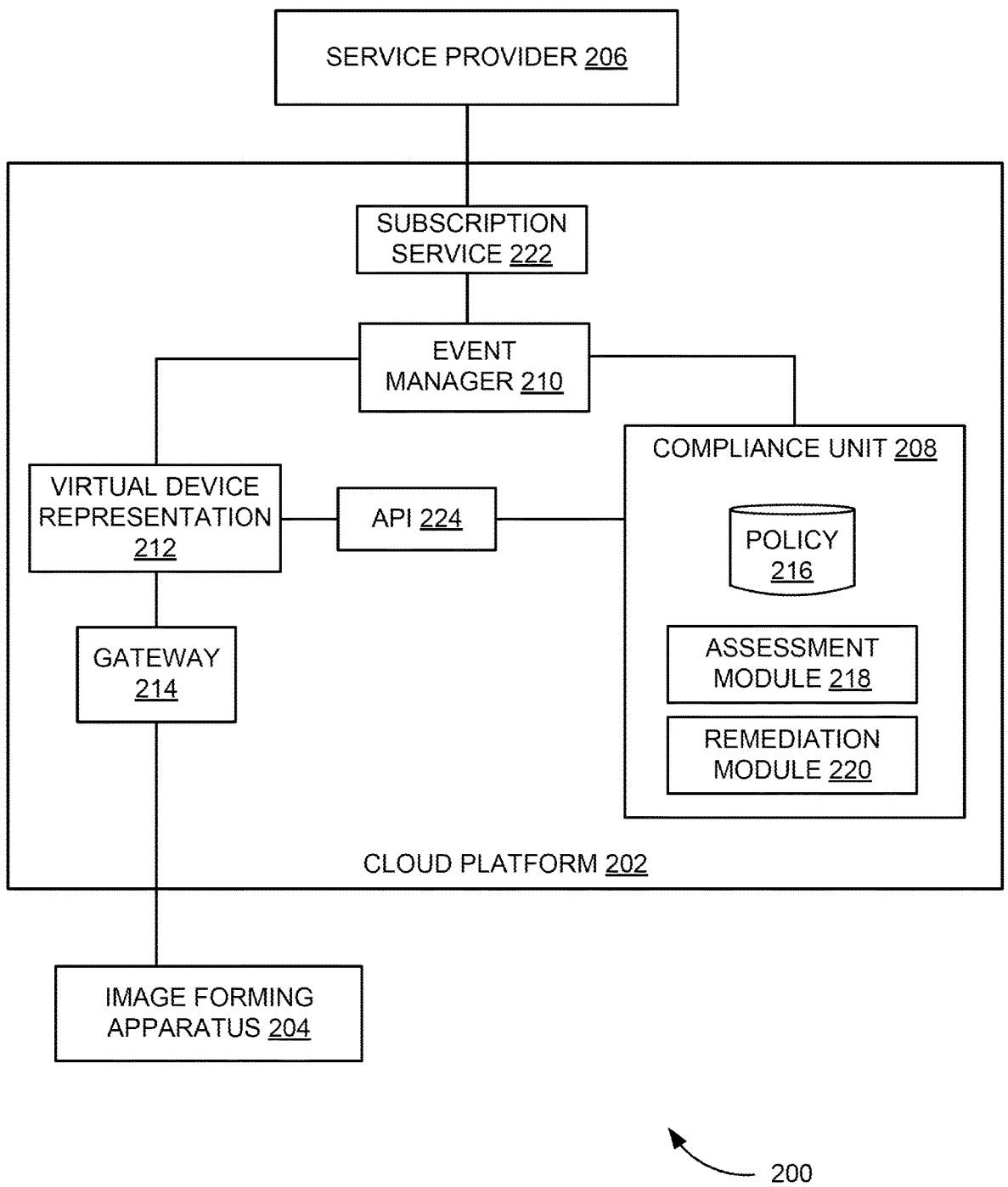
FIG. 2 is an example system, including a cloud platform to monitor compliance of an image forming apparatus and initiate a remediation action.

FIG. 2 is an example system 200, including a cloud platform 202 to monitor a compliance of an image forming apparatus 204 and initiate a remediation action. As shown in FIG. 2, system 200 may include cloud platform 202, image forming apparatus 204, and a service provider 206. Service provider 206 may offer a compliance service and register the compliance service with a subscription service 222 on cloud platform 202. Upon registration of the compliance service, the compliance service may become a resident in a cloud network. Further, cloud platform 202 may include a compliance unit 208 to offer or provide the registered compliance service as a cloud-based service or as part of cloud platform 202 to customers/users. In an example, compliance unit 208 may add the compliance service offered by service provider 206, for instance, to a catalog. Example catalog may include a list of cloud services that are offered by corresponding service providers.

Furthermore, cloud platform 202 may include a registration unit (e.g., such as registration unit 108 of FIG. 1) to enable image forming apparatus 204 to register to the compliance service. Upon registration, cloud platform 202 may include a shadow generation unit (e.g., such as shadow generation unit 110 of FIG. 1) to generate a virtual device representation 212 corresponding to image forming apparatus 204 on cloud platform 202. For example, virtual device representation 212 may include configuration data representing a current configuration state (e.g., a cached state) of image forming apparatus 204. In this example, cloud platform 202 may create a persistent, virtual version, or "device shadow," (e.g., virtual device representation or "virtual shadow representation") of image forming apparatus 204 that includes a latest reported configuration state.

In an example, cloud platform 202 may enable synchronization of the configuration state of virtual device representation 212 with a configuration state of image forming apparatus 204 at defined intervals via a gateway 214. Example gateway 214 may be an internet of things (IoT) gateway. The IoT gateway may be a physical device or software program that serves as a connection point between cloud platform 202 and image forming apparatus 204.

In one example, image forming apparatus 204 may send the configuration data describing a change in the configuration state of image forming apparatus 204 to cloud platform 202. In this example, cloud platform 202 may receive the configuration data via gateway 214 and synchronize/update virtual device representation 212 with the received configuration data. In another example, cloud platform 202 may poll image forming apparatus 204 at defined intervals to obtain the configuration data describing the change in the configuration state of image forming apparatus 204 and synchronize/update virtual device representation 212 with the obtained configuration data.

Further, any change in the configuration data may be published to an event manager 210. Furthermore, compliance unit 208 may subscribe to an event generated by event manager 210 to receive a change event corresponding to the configuration data of the image forming apparatus 204. As shown in FIG. 2, compliance unit 208 may include an assessment module 218 and a remediation module 220. Compliance unit 208, event manager 210, assessment module 218, remediation module 220, and subscription service 222 may include any combination of hardware and programming to implement the functionalities described herein.

In response to receiving the change event via event manager 210, assessment module 218 may evaluate virtual device representation 212 to determine whether the change in the configuration state of image forming apparatus 204 is compliant with policy 216 (e.g., a security policy). The security policy may be defined by a user and include one or multiple security settings that image forming apparatus 204 is to comply with. In other examples, assessment module 218 may receive the changed configuration data of image forming apparatus 204 either directly or via event manager 210 and evaluate policy 216 against the changed configuration data of image forming apparatus 204.

Furthermore, remediation module 220 may initiate a remediation action to bring image forming apparatus 204 to compliance via virtual device representation 212 in response to a determination that the change in the configuration state is not compliant with policy 216. In this example, remediation module 220 may update the configuration data of virtual device representation 212 via an API 224 to bring image forming apparatus 204 to compliance. In one example, compliance unit 208 may use API 224 to obtain the configuration data and update the configuration data on virtual device representation 212, which is performed in response to receiving the change event from event manager 210.

Further, cloud platform 202 may enable synchronization of image forming apparatus 204 with the updated configuration data (e.g., an updated setting) represented by updated virtual device representation 212. Thus, compliance unit 208 may control a configuration state of image forming apparatus 204, that is connected to gateway 214, through virtual device representation 212.

Figure 3:
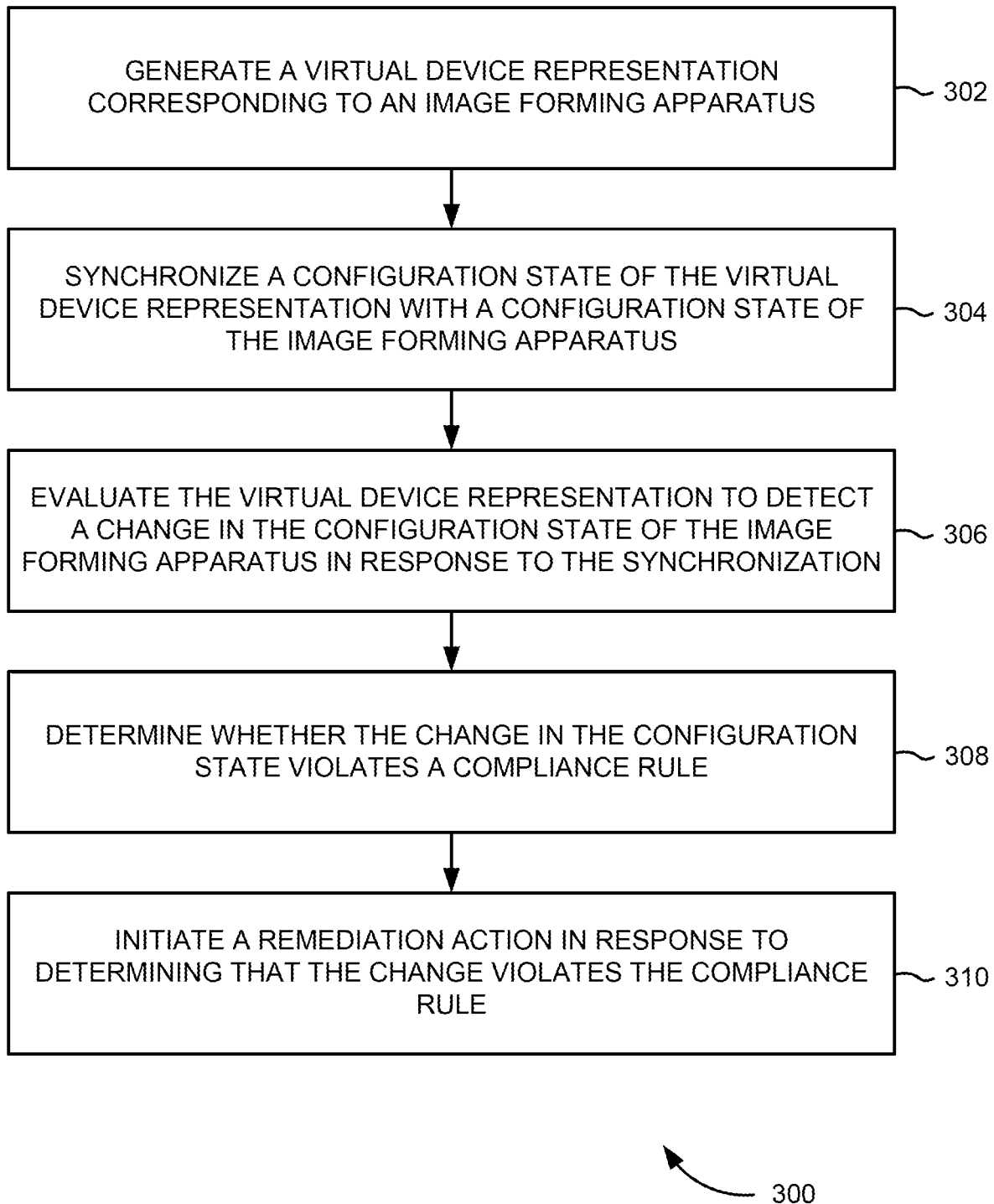
FIG. 3 is a flowchart illustrating an example method for initiating a remediation action via a virtual device representation to bring an image forming apparatus to compliance.

FIG. 3 is a flowchart illustrating an example method 300 for initiating a remediation action via a virtual device representation to bring an image forming apparatus to compliance. It should be understood that method 300 depicted in FIG. 3 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. The processes of method 300 may represent functions and/or actions performed by functionally equivalent circuits like analog circuits, digital signal processing circuits, application specific integrated circuits (ASICs), or other hardware components associated with the system. Furthermore, example method 300 may not be intended to limit the implementation of the present application, but rather example method 300 illustrates functional information to design/fabricate circuits, generate machine-readable instructions, or use a combination of hardware and machine-readable instructions to perform the illustrated processes.

At 302, a virtual device representation (e.g., a device shadow) corresponding to the image forming apparatus may be generated. In an example, generating the virtual device representation may include:

registering the image forming apparatus to a compliance service in response to receiving a request, and generating the virtual device representation corresponding to the image forming apparatus in a storage associated with the compliance service.

At 304, a configuration state of the virtual device representation may be synchronized with a configuration state of the image forming apparatus. In an example, synchronizing the configuration state of the virtual device representation with the configuration state of the image forming apparatus may include:

receiving a change in configuration data of the image forming apparatus as published by the image forming apparatus, and updating the configuration state of the virtual device representation based on the received change in the configuration data. The updated virtual device representation may reflect a current configuration state of the image forming apparatus.

Example change in the configuration state may include a change in a configuration rule, a configuration setting, a security parameter, or any combination thereof. In another example, synchronizing the configuration state of the virtual device representation with the configuration state of the image forming apparatus may include:

monitoring the image forming apparatus for the change in the configuration data of the image forming apparatus, and updating the configuration state of the virtual device representation in response to detecting the change in the configuration data. The updated virtual device representation may reflect a current configuration state of the image forming apparatus.

At 306, the virtual device representation may be evaluated to detect a change in the configuration state of the image forming apparatus in response to the synchronization. For example, the change in the configuration state may include a change in a security setting of the image forming apparatus. Example security settings can be related to, for example, user authentication, printing services, server authentication, password management, device configuration, web services, device control, file system access protocols, e-mail and/or fax services or the like.

At 308, a check may be made to determine whether the change in the configuration state violates a compliance rule. In an example the compliance rule may include a policy indicating an allowable change to the configuration state of the image forming apparatus. Example policy may be a security policy.

At 310, a remediation action may be initiated in response to determining that the change violates the compliance rule. In an example, the remediation action may include resetting the configuration state of the image forming apparatus via the virtual device representation to bring the image forming apparatus to compliance with the compliance rule. Upon resetting the image forming apparatus, the compliance rule may generate an assessment result to certify that the image forming apparatus is compliant with the compliance rule.

Thus, examples described herein may constantly monitor the compliance of the registered image forming apparatus against the policy, and when the image forming apparatus falls out of compliance, initiate an automatic or a manual remediation action to bring the image forming apparatus back to compliance. Examples described herein may also administer the policy to a fleet of image forming apparatuses in an organization. In this example, the security policy can include a separate list of security settings for each image forming apparatus in the fleet or include a common list of security settings for the fleet. In other examples, multiple security policies can be created for groups of image forming apparatuses in the fleet of image forming apparatuses. Examples described herein may be implemented in a cloud-computing environment, a physical computing environment, a virtual computing environment, or the like.

Figure 4:
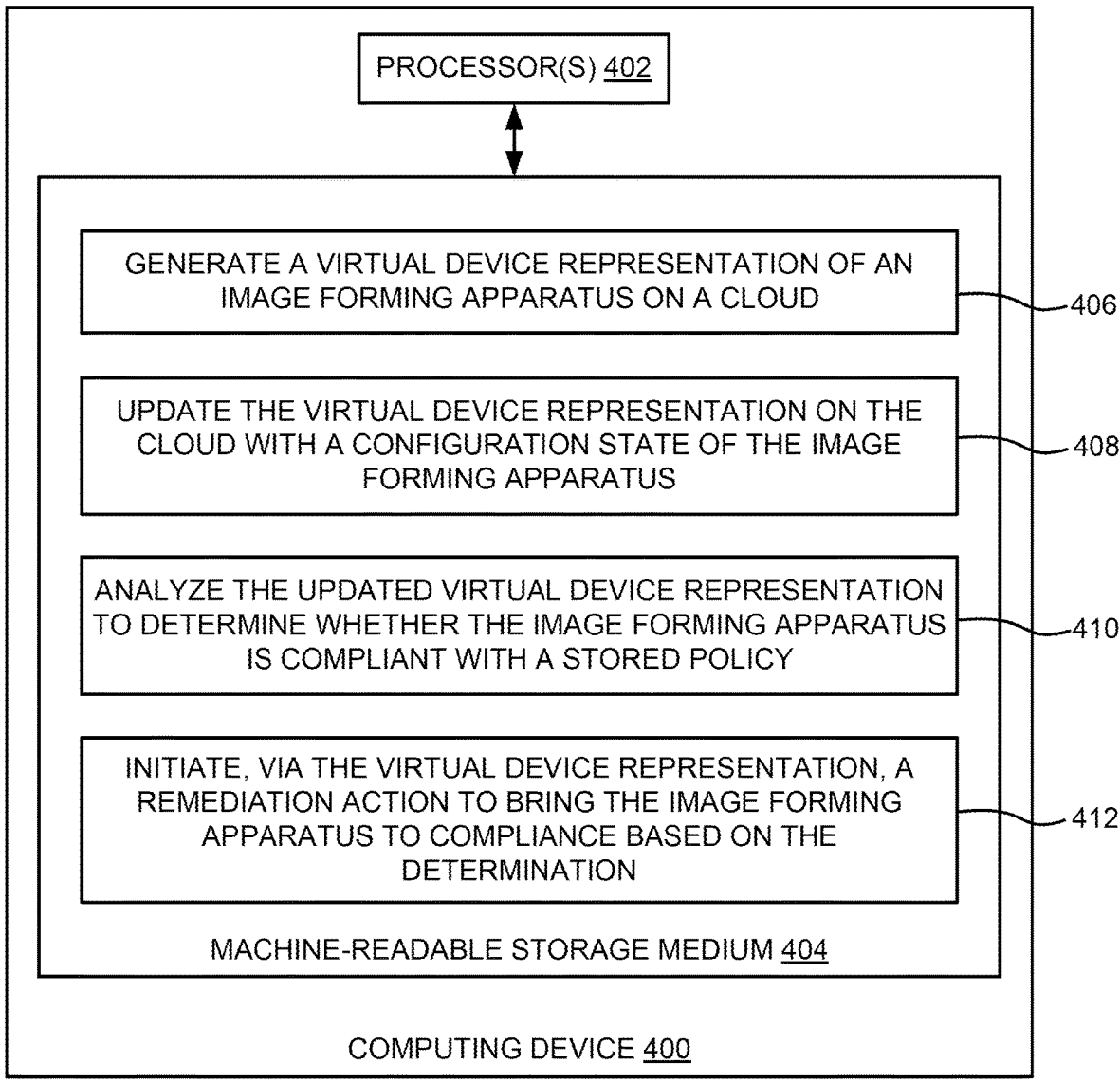
FIG. 4 is a block diagram of an example computing device including non-transitory machine-readable storage medium storing instructions to bring an image forming apparatus to compliance.

FIG. 4 is a block diagram of an example computing device 400 including non-transitory machine-readable storage medium 404 storing instructions (e.g., 406 to 412) to bring an image forming apparatus to compliance. Computing device 400 may include a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 404 may be non-transitory machine-readable medium. Machine-readable storage medium 404 may be remote but accessible to computing device 400.

As shown in FIG. 4, machine-readable storage medium 404 may store instructions 406-412. In an example, instructions 406-412 may be executed by processor 402 to bring the image forming apparatus to compliance to a stored policy. Instructions 406 may be executed by processor 402 to generate a virtual device representation of the image forming apparatus on a cloud.

Instructions 408 may be executed by processor 402 to update the virtual device representation on the cloud with a configuration state of the image forming apparatus. Instructions 410 may be executed by processor 402 to analyze the updated virtual device representation to determine whether the image forming apparatus is compliant with a stored policy. In an example, instructions to update the virtual device representation on the cloud may include instructions to update the virtual device representation on the cloud with the configuration state of the image forming apparatus during setup of the image forming apparatus or during operation of the image forming apparatus (e.g., after the setup).

Instructions 412 may be executed by processor 402 to initiate, via the virtual device representation, a remediation action to bring the image forming apparatus to compliance based on the determination. In an example, instructions to initiate the remediation action may include instructions to modify a configuration state of the virtual device representation to bring the image forming apparatus to compliance in response to the determination that the image forming apparatus is not in compliant with the stored policy. Further, instructions to initiate the remediation action may include instructions to enable synchronization of the image forming apparatus with the modified configuration state represented by the virtual device representation.

Further, instructions may be executed by processor 402 to synchronize the configuration state of the virtual device representation with a configuration state of the image forming apparatus at defined intervals. Furthermore, instructions may be executed by processor 402 to detect a change in a version of the stored policy, analyze the virtual device representation to determine whether the image forming apparatus is compliant with the changed version, and initiate, via the virtual device representation, the remediation action to bring the image forming apparatus to compliance in accordance with the changed version.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A non-transitory computer-readable storage medium encoded with instructions that, when executed by a computing device communicatively connected to an image forming apparatus and different than the image forming apparatus, cause the computing device to:
   generate a virtual device representation of the image forming apparatus on a cloud;
   update a configuration state of the virtual device representation on the cloud with a configuration state of the image forming apparatus;
   upon updating the configuration state of the virtual device representation, analyze the updated configuration state of the virtual device representation to determine whether the image forming apparatus is compliant with a stored policy, as opposed to determine whether the updated configuration state of the virtual device representation is in synchronization with and reflects a current configuration state of the image forming apparatus, wherein at time of analysis the configuration state of the virtual device representation is in synchronization with and accurately reflects the current configuration state of the image forming apparatus;
   initiate, via the virtual device representation, a remediation action to bring the image forming apparatus to compliance based on the determination by:
      modifying the configuration state of the virtual device representation to bring the image forming apparatus to compliance in response to the determination that the image forming apparatus is not in compliance with the stored policy; and
      enabling synchronization of the image forming apparatus with the modified configuration state represented by the virtual device representation, such that the current configuration state of the image forming apparatus is synchronized to the modified configuration state represented by the virtual device representation.

2. The non-transitory computer-readable storage medium of claim 1, further comprising instructions to:
   synchronize the configuration state of the virtual device representation with the configuration state of the image forming apparatus at defined intervals.

3. The non-transitory computer-readable storage medium of claim 1, further comprising instructions to:
   detect a change in a version of the stored policy;
   analyze the virtual device representation to determine whether the image forming apparatus is compliant with a stored policy;
   analyze the virtual device representation to determine whether the image forming apparatus is compliant with the changed version; and
   initiate, via the virtual device representation, the remediation action to bring the image forming apparatus to compliance in accordance with the changed version.

4. The non-transitory computer-readable storage medium of claim 1, wherein instructions to update the virtual device representation on the cloud comprise instructions to:
   update the virtual device representation on the cloud with the configuration state of the image forming apparatus during setup of the image forming apparatus or during operation of the image forming apparatus.

5. A cloud server that is to communicatively connect to an image forming apparatus and that is different than the image forming apparatus, the cloud server comprising:
   a processor; and
   a memory coupled to the processor and storing instructions executable by the processor to:
      register the image forming apparatus to a cloud service via a network;
      generate a virtual device representation corresponding to the image forming apparatus in the cloud service in response to registering the image forming apparatus, the virtual device representation comprising first configuration data representing a configuration state of the image forming apparatus;
      upon generating the virtual device representation, evaluate the virtual device representation to determine whether the image forming apparatus is compliant with a policy stored in a repository, as opposed to determine whether the virtual device representation is in synchronization with and reflects a current configuration state of the image forming apparatus, wherein at time of analysis the virtual device representation is in synchronization with and accurately reflects the current configuration state of the image forming apparatus;
      modify a configuration state of the virtual device representation to bring the image forming apparatus to compliance in response to a determination that the image forming apparatus is not in compliance with the policy;
      transmit a notification indicative of a modified configuration state represented by the modified virtual device representation to the image forming apparatus via the network; and
      enable synchronization of the image forming apparatus with the modified configuration state represented by the modified virtual device representation, such that the current configuration state of the image forming apparatus is synchronized to the modified configuration state represented by the virtual device representation.

6. The cloud server of claim 5, wherein the instructions are executable by the processor to further:
   update the virtual device representation based on second configuration data obtained from the image forming apparatus at a defined interval, wherein the second configuration data describes a change in the configuration state of the image forming apparatus; and
   repeat evaluation, modification, and transmission of the notification corresponding to the updated virtual device representation.

7. The cloud server of claim 5, wherein the instructions are executable by the processor to further:
- detect a change in the policy;
- analyze the virtual device representation to determine whether the image forming apparatus is compliant with the changed policy;
- modify the virtual device representation to bring the image forming apparatus to compliance in response to a determination that the image forming apparatus is not in compliance with the changed policy; and
- transmit another notification indicative of the further modified configuration state represented by the modified virtual device representation to the image forming apparatus.

8. The cloud server of claim 5, wherein the policy comprises a security policy.

9. A method comprising:
- generating, by a computing device communicatively connected to an image forming apparatus and different than the image forming apparatus, a virtual device representation corresponding to the image forming apparatus;
- synchronizing, by the computing device, a configuration state of the virtual device representation with a configuration state of the image forming apparatus;
- evaluating, by the computing device, the virtual device representation to detect a change in the configuration state of the image forming apparatus in response to the synchronization;
- upon synchronization, evaluating, by the computing device, the virtual device representation to determine whether the image forming apparatus violates a compliance rule, as opposed to determine whether the virtual device representation is in synchronization with and reflects a current configuration state of the image forming apparatus, wherein at time of analysis the virtual device representation is in synchronization with and accurately reflects the current configuration state of the image forming apparatus; and
- initiating, by the computing device, a remediation action in response to determining that the image forming apparatus violates the compliance rule, by:
  - modifying a configuration state of the virtual device representation to bring the image forming apparatus to compliance in response to the determination that the image forming apparatus is not in compliance with the stored policy; and
  - enabling synchronization of the image forming apparatus with the modified configuration state represented by the virtual device representation, such that the current configuration state of the image forming apparatus is synchronized to the modified configuration state represented by the virtual device representation.

10. The method of claim 9, wherein generating the virtual device representation comprises:
- registering the image forming apparatus to a compliance service in response to receiving a request; and
- generating the virtual device representation corresponding to the image forming apparatus in a storage associated with the compliance service.

11. The method of claim 9, wherein synchronizing the configuration state of the virtual device representation with the configuration state of the image forming apparatus comprises:
- receiving a change in configuration data of the image forming apparatus as published by the image forming apparatus; and
- updating the configuration state of the virtual device representation based on the received change in the configuration data, wherein the updated virtual device representation is to reflect the current configuration state of the image forming apparatus.

12. The method of claim 9, wherein synchronizing the configuration state of the virtual device representation with the configuration state of the image forming apparatus comprises:
- monitoring the image forming apparatus for a change in configuration data of the image forming apparatus; and
- updating the configuration state of the virtual device representation in response to detecting the change in the configuration data, wherein the updated virtual device representation is to reflect the current configuration state of the image forming apparatus.

13. The method of claim 9, wherein the change in the configuration state comprises a change in a configuration rule, a configuration setting, a security parameter, or any combination thereof.

* * * * *